(No Model.)

W. R. KRAMER.
GATE HINGE.

No. 341,423. Patented May 4, 1886.

Witnesses
Susie R. Seiler.
G. P. Kramer.

Inventor
William R. Kramer
By his Attorneys
R. S. & A. P. Lacey

UNITED STATES PATENT OFFICE.

WILLIAM R. KRAMER, OF FAIRMOUNT, INDIANA.

GATE-HINGE.

SPECIFICATION forming part of Letters Patent No. 341,423, dated May 4, 1886.

Application filed February 15, 1886. Serial No. 192,033. (No model.)

*To all whom it may concern:*

Be it known that I, WILLIAM R. KRAMER, a citizen of the United States, residing at Fairmount, in the county of Grant and State of Indiana, have invented certain new and useful Improvements in Gate-Hinges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of horizontally-swinging farm-gates provided with suitable attachments for holding them at different elevations for the purpose of giving clearance for snow or other obstruction, and for separating small from larger stock.

The invention particularly relates to the construction and combination of the attachments or devices for holding the gate in different elevations, all as more fully hereinafter set forth, claimed, and shown in the annexed drawings, in which—

Figure 1:
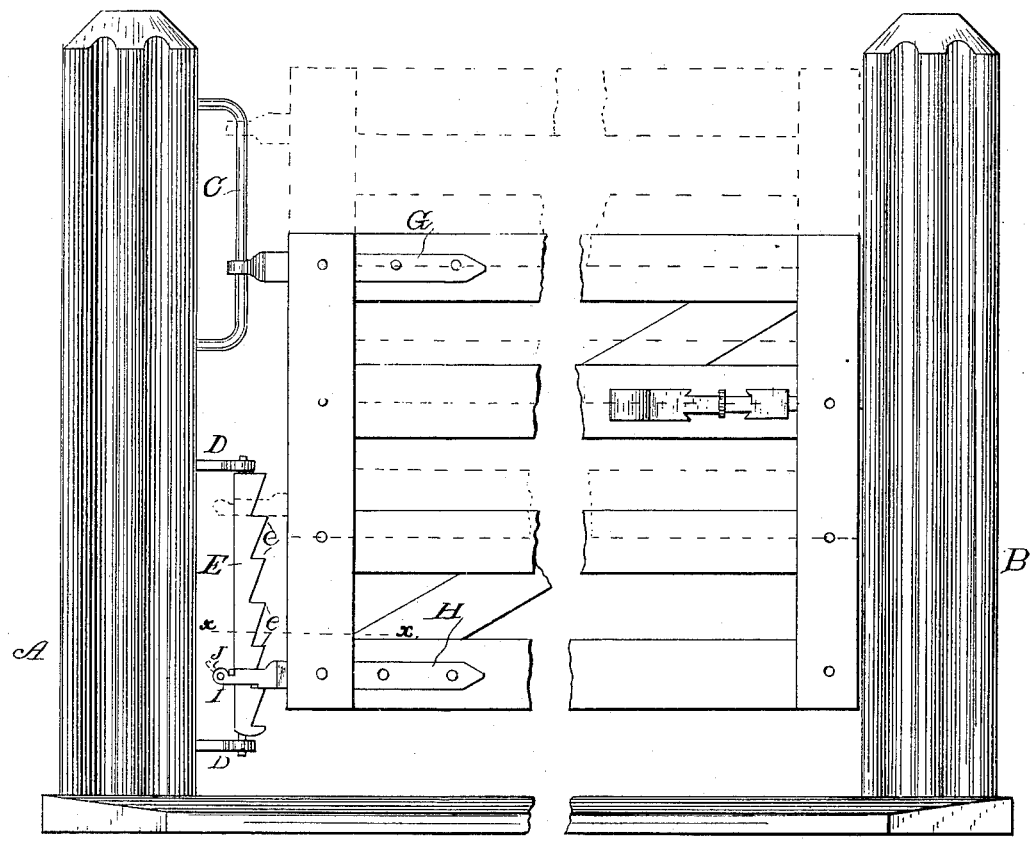
Figure 2:
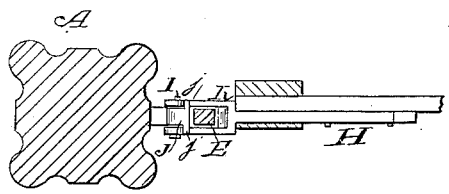
Figure 3:
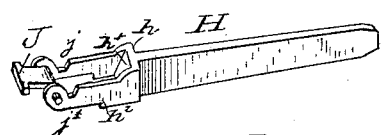

Figure 1 is a side elevation of a gate provided with my improvements, the central portion of the gate being broken away for convenience of illustration. Fig. 2 is a detail section on the line X X of Fig. 1. Fig. 3 is an enlarged perspective detail view of the clamping-strap.

The posts A and B are arranged one on each side of the roadway, the former being the hinge, the latter the latch-post.

The upper portion of the hinge-post is provided with a staple, C, and its lower portion has arms D arranged at a distance apart, between which a bar, E, is pivoted to swing laterally. Straps G and H project from the end of the gate and engage the staple C and bar E, respectively. Strap G has an opening through its outer end for the passage of the staple, on which it has a free longitudinal movement. The outer end of strap H is enlarged, forming a bifurcated head, $h$, the arms of which extend on each side of the bar E and project beyond its rear edge. The arms, near their outer extremities, are provided with transverse perforations, through which a pin, I, passes to form a tie and prevent the accidental disengagement of the strap and bar. The forward edge of the bar E is serrated or provided with teeth $e$, and the wall $h'$, between the arms of the strap H, is correspondingly inclined to form a better engagement between the strap and bar, as will be readily appreciated. There is sufficient space between the pin I and the wall $h'$ of the strap to permit a slight movement of the lower part of the gate to and from the bar E, in order to effect a disengagement of the strap from the teeth of the bar when it is desired to adjust the gate to a higher or lower level. The proper adjustment having been made, the wall $h'$ of the strap is permitted to engage a tooth of the pivoted bar E, and is held thereto by a catch, J, mounted on the pin I and filling the space between the pin and the rear side of the bar. Projections $j$, extending laterally on each side of the pivoted catch J, fit in corresponding notches, $j'$, in the arms $h^2$ of the head of the clamping-strap and prevent said catch from dropping down between the arms. When catch J is thrown back, as shown by dotted lines, Fig. 1, the gate may be adjusted to any desired level; but when bearing against the rear edge of the bar the position of the gate is fixed as the clamping-strap is locked to the pivoted bar E.

I am aware that it is not new to provide a gate-post with a vertically-pivoted rack-bar and have the hinge-strap or bolt projecting from the gate formed with an elongated opening in its outer end to permit the vertical adjustment thereof on the rack-bar, to which it becomes locked simply by the sagging of the gate, which causes a side inclosing the opening through the bolt to engage a tooth of the bar.

Having thus described my invention, what I claim, and desire to secure by Letters Patent, is—

1. The combination, with the post and toothed bar pivoted thereto to swing laterally, of a gate, a strap projecting therefrom and having a bifurcated head to embrace the sides of the toothed bar, and a catch pivoted between the ends of the bifurcation of the head to bear on the rear edge of the toothed bar, as and for the purposes set forth.

2. The combination of the gate-post, a toothed bar pivoted thereto to swing laterally, a vertically-adjustable gate, a strap projected therefrom and having a bifurcated head to embrace the sides of the toothed bar, the wall between the arms of the head being inclined in conformity to the teeth of the bar, and a catch pivoted between the arms of the head and having lateral projections to fit in recesses in the upper edges of the arms, said catch being arranged to bear on the rear side of the toothed bar and lock the gate in its adjusted position, substantially as hereinbefore set forth.

In testimony whereof I affix my signature in presence of two witnesses.

WILLIAM R. KRAMER.

Witnesses:
EZRA N. OAKLEY,
H. B. CASSELL.